(12) United States Patent
Decker et al.

(10) Patent No.: US 7,830,824 B2
(45) Date of Patent: Nov. 9, 2010

(54) SYSTEM AND METHOD FOR PROVIDING RESERVATIONLESS THIRD PARTY MEETING ROOMS

(75) Inventors: Eran Decker, Givataeem (IL); Rami Yochai Boneh, Sunnyvale, CA (US)

(73) Assignee: Polycom, Inc., Pleasanton, CA (US)

( * ) Notice: Subject to any disclaimer, the term of this patent is extended or adjusted under 35 U.S.C. 154(b) by 1721 days.

(21) Appl. No.: 10/960,337

(22) Filed: Oct. 7, 2004

(65) Prior Publication Data

US 2005/0058088 A1 Mar. 17, 2005

Related U.S. Application Data

(63) Continuation-in-part of application No. 09/790,577, filed on Feb. 22, 2001, now Pat. No. 7,085,243.

(60) Provisional application No. 60/186,002, filed on Mar. 1, 2000.

(51) Int. Cl.
*H04Q 11/00* (2006.01)
(52) U.S. Cl. .................................. 370/262; 379/205.01
(58) Field of Classification Search ................. 370/360, 370/260–266, 362, 259, 352; 379/93.21, 379/202.01, 158, 205.01, 203.01, 204.01; 455/416; 709/227, 228
See application file for complete search history.

(56) References Cited

U.S. PATENT DOCUMENTS

| | | | |
|---|---|---|---|
| 4,455,455 A | 6/1984 | Little | |
| 5,436,962 A | 7/1995 | Hirata | |
| 5,530,472 A * | 6/1996 | Bregman et al. | 348/14.09 |
| 5,574,911 A | 11/1996 | D'Angelo et al. | |
| 5,657,096 A | 8/1997 | Lukacs | |
| 5,737,011 A | 4/1998 | Lukacs | |
| 5,812,652 A | 9/1998 | Jodoin et al. | |

(Continued)

FOREIGN PATENT DOCUMENTS

GB 2 313 250 11/1997

(Continued)

OTHER PUBLICATIONS

ITU-T Recommendation H.323: "Visual Telephone Systems and Equipment for Local area Networks which Provide a Non-Guaranteed Quality of Service" International Telecommunication Union, Nov. 1996.

(Continued)

*Primary Examiner*—Fan Tsang
*Assistant Examiner*—Akelaw A Teshale
(74) *Attorney, Agent, or Firm*—Wong, Cabello, Lutsch, Rutherford & Brucculeri, LLP (57) ABSTRACT

A video and/or audio conferencing system having virtual meeting room services is disclosed. The virtual meeting room services enables a third party to control and manage one or more virtual meeting rooms. Each third party organization may receive one or more dial in numbers, which is associated with a profile that defines the type of the conference that can be conducted. The profile defines the "capabilities" of the virtual meeting room, such as the maximum number of conferees, type of conference, type of endpoints, transcoding and protocol requirement, etc. Each virtual meeting room may have an NID (Numerical Identification) used by the peers along with the dial-in number to join the virtual meeting room.

22 Claims, 8 Drawing Sheets

U.S. PATENT DOCUMENTS

| | | | |
|---|---|---|---|
| 5,835,129 A | 11/1998 | Kumar | |
| 5,852,466 A | 12/1998 | Komine et al. | |
| 5,896,128 A | 4/1999 | Boyer | |
| 5,907,324 A | 5/1999 | Larson et al. | |
| 5,959,662 A | 9/1999 | Shaffer et al. | |
| 5,978,363 A | 11/1999 | Dimitrijevic et al. | |
| 5,995,608 A * | 11/1999 | Detampel et al. | 379/205.01 |
| 6,021,263 A | 2/2000 | Kujoory et al. | |
| 6,038,304 A | 3/2000 | Hart | |
| 6,163,531 A | 12/2000 | Kumar | |
| 6,181,786 B1 | 1/2001 | Detampel, Jr. et al. | |
| 6,195,117 B1 | 2/2001 | Miyazaki | |
| 6,396,510 B1 * | 5/2002 | Pendse et al. | 715/739 |
| 6,411,605 B1 * | 6/2002 | Vance et al. | 370/261 |
| 6,463,038 B1 | 10/2002 | Wilson | |
| 6,611,503 B1 | 8/2003 | Fitzgerald et al. | |
| 6,657,975 B1 * | 12/2003 | Baxley et al. | 370/260 |
| 6,731,734 B1 * | 5/2004 | Shaffer et al. | 379/202.01 |
| 6,754,322 B1 * | 6/2004 | Bushnell | 379/202.01 |
| 2001/0012304 A1 * | 8/2001 | Agraharam et al. | 370/487 |

FOREIGN PATENT DOCUMENTS

| | | |
|---|---|---|
| GB | 2 313 250 A | 11/1997 |
| WO | 96/63157 A1 | 11/1996 |
| WO | WO 96/36157 | 11/1996 |
| WO | 99-27701 A1 | 6/1999 |
| WO | WO 99/27701 | 6/1999 |

OTHER PUBLICATIONS

Schaphorst, Richard; "Status of Standards for Teleconferencing & Multimedia Communications;" IEEE; Nov. 1997; pp. 213-217.

Fredette, Paul; "The Past, Present and Future of Inverse Multiplexing;" IEEE; Apr. 1994; pp. 42-46.

Supplemental European Search Report received in co-pending European Application Serial No. 01908089.4; Sep. 2004.

Supplemental European Search Report from related European Application Serial No. 01908089.4, Sep. 3, 2004.

* cited by examiner

SYSTEM AND METHOD FOR PROVIDING RESERVATIONLESS THIRD PARTY MEETING ROOMS

CROSS-REFERENCE TO RELATED APPLICATIONS

This patent application is a continuation-in-part of U.S. application Ser. No. 09/790,577, filed Feb. 22, 2001, now U.S. Pat. No. 7,085,243, which in turn was a nonprovisional filing based from U.S. Provisional Application Ser. No. 60/186,022, filed Mar. 1, 2000. Priority is claimed to these foregoing applications, and they are incorporated herein by reference in their entireties.

TECHNICAL FIELD

This invention relates to the field of audio and video conferencing and, more particularly, relates to automating the process of coordinating and setting up audio and video conferences among peers of one or more organizations.

BACKGROUND

Traditionally, customers wishing to use a multi-point video conferencing service must reserve their conferences in advance. The customer must provide several parameters to complete such a reservation, including the number and types of terminals, line-speed, type of audio algorithm, start-time, end-time, video algorithm, type of network, along with other pertinent parameters. Providing these parameters presents a problem to both conference participants and service providers due to the fact that acquiring this information is difficult and providing this information makes the process of setting up or initiating a conference tedious and inconvenient. In addition, the customer must provide this information well in advance of the actual conference to reserve time and resources, and to allow adequate time to process the information and incorporate it into the conference setup.

Companies that provide video conferencing services typically use reservation-based systems to manage the service. Using such a service, a client contacts the service provider prior to the start of the conference to book or reserve the conference and any necessary facilities or resources. When making the reservation, the customer must provide the service operator with parameters, such as the number and types of terminals, line-speed, type of audio algorithm, start-time, end-time and other parameters. In response, the service operator must input these parameters into the reservations system.

Figure 1:
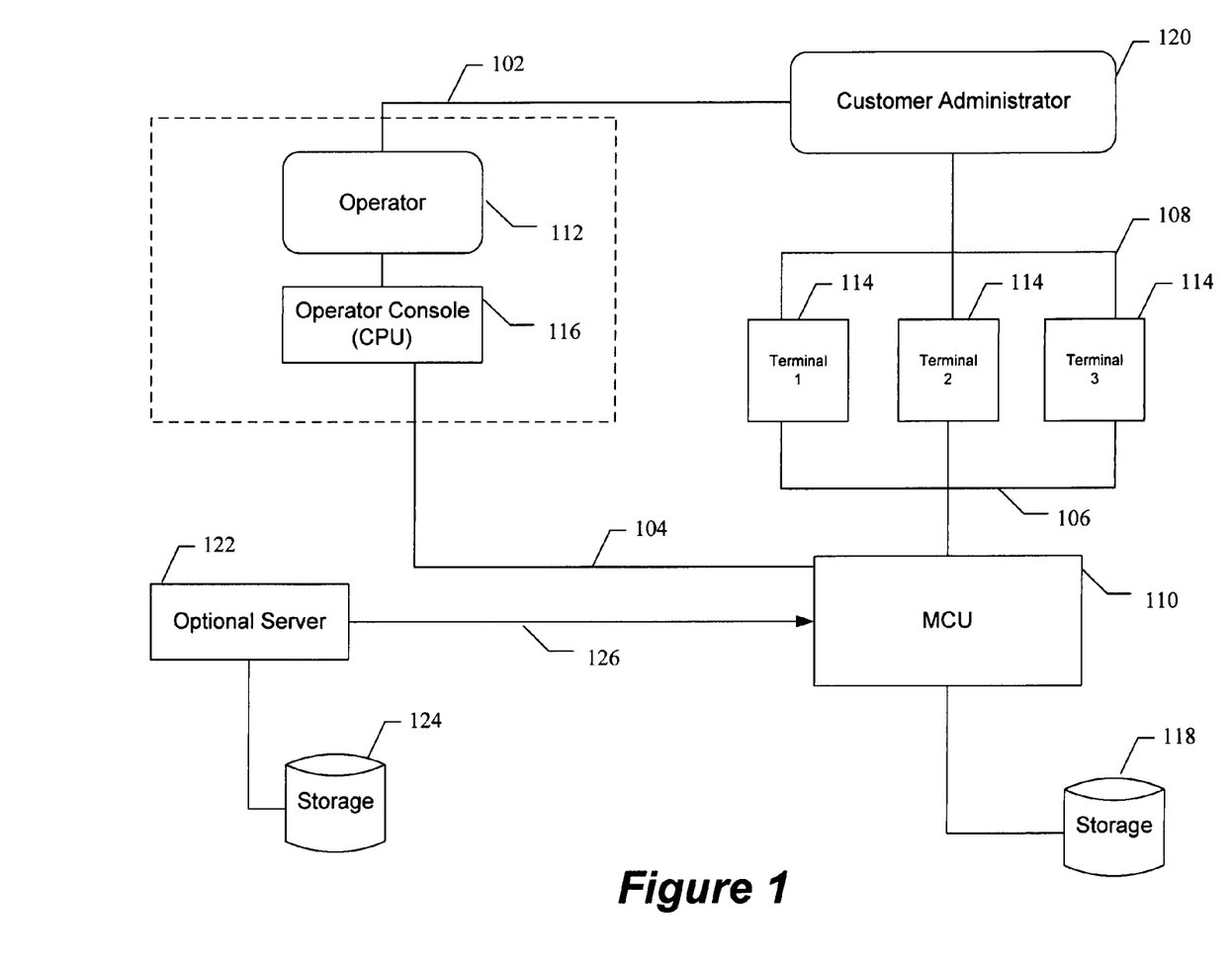
FIG. 1 is a block diagram illustrating atypical system architecture of an audio and/or video conferencing system of the present invention.

FIG. 1, described in further detail later, is a block diagram illustrating a typical system architecture of an audio/video conferencing system.

Using a system as illustrated in FIG. 1, a service provider sets up an audio and/or video conference for a customer by completing the following tasks:

(1) A customer administrator 120 contacts, using a telephone, facsimile, e-mail or other means a service provider operator 112.

(2) The service provider operator 112 receives conference parameters from the customer administrator 120 and loads them into the reservation system via an operator console 116.

(3) The service provider operator 112 notifies the customer administrator 120 with a confirmation of the reserved conference details (the ISDN number(s) or network address such as IP address, URL, etc.) that will be used to connect to the conference).

(4) The customer administrator 120 provides the details of the conference, such as start-time and the number to call, to the participants or terminals 114 that will participate in the conference.

(5) The video conference is started on the service provider's MCU 110 at the reserved time and lasts for the pre-defined duration. During this time the conference terminals 114 can be connected to the conference.

(6) When the duration set for the conference is over, the conference is terminated and the terminals 114 are disconnected.

For each customer that attempts to set up a conference call, each step in the process must be repeated.

These prior art techniques for reserving and initiating conferences are disadvantageous for several reasons. One reason is that the prior art techniques require a cumbersome reservation procedure. Also, if the actual duration of the conference is longer than the reserved time, the conference may terminate in the middle of a discussion. If the actual duration of the conference is shorter than the reserved time, the customer will end up paying for the unused time. Thus, there is a need in the art for a system and method to schedule and reserve audio and/or video conferences that allows more flexibility in the length of the conference.

Another disadvantage in the prior art techniques is that they do not allow any flexibility in the start-time of the conference and/or the number of participants in the conference. In today's complex world, conferences are often canceled at the last minute. Using the reservation techniques in the prior art, this lack of flexibility can be quite costly. Thus, there is a need in the art for a system and method to schedule and reserve audio and/or video conferences that allows more flexibility in the start time of the conference and the number of participants.

Yet another disadvantage of the prior art techniques is that they require extensive overhead to set up a conference. For instance, an operator is required on the service provider side and a conference administrator is required on the customer side. This overhead escalates the cost associated with providing audio and/or video conferencing services. Thus, there is a need in the art for a system and a method to schedule and reserve audio and/or video conferences that limits the amount of required overhead.

Furthermore, large companies are generally willing to have "virtual meeting rooms" in an audio/video conferencing system which can be scheduled and used by corporation's peers as conventional meeting rooms are used. Peers may reserve a virtual meeting room for a future meeting (audio/video conference) or may try to use an unreserved virtual meeting room for an impromptu meeting. Ordering a virtual meeting room may be done via a local server that resides in a corporate Intranet in a similar way that conventional meeting rooms are managed. Companies prefer to control and manage their virtual meeting rooms while outsourcing the conferencing resources from audio/video conferencing service provider. Other corporations may own and use their own MCU but still would like to manage and control the usage of the MCU by their own scheduling system, or scheduling server. These two types of corporations—the ones that outsources the conferencing resources and the ones that use their own conferencing resources—are referred to herein as third parties. Current conference technology lacks the capabilities of offering virtual meeting rooms that can be managed by one or more third parties that offer virtual meeting room to their peers.

Therefore, it is clear that there is a need in the art for system and method for providing reservation-based or reservation-less audio and/or video conferences using virtual meeting rooms that can be managed and scheduled from an external sever that belongs to a third party which offers such services to its peers.

SUMMARY OF THE INVENTION

The present invention solves the above-described problems by providing a system and method for providing virtual meeting rooms to one or more third party organizations. In general, the present invention removes the need for reservations. Instead, customers are able to initiate their own conferences at their convenience, without the need for pre-booking or operator intervention.

The present invention advantageously limits or eliminates the need for a human operator, and instead a moderator can initiate the conference without contacting an operator. The moderator simply initiates the conference by dialing a dial-in conference number. In addition, the present invention eliminates the need to identify the conference start-time, the conference duration and the number of required resources, such as the number of participants, prior to reserving the conference. Another aspect of the present invention is an auto rate detector. The auto rate detector enables the connection of terminals to a conference without any prior knowledge about the terminal capabilities, such as the type of terminal, the terminal bit rate, or the like. Advantageously, this aspect of the present invention reduces the overhead required in setting up a conference. Yet another aspect of the present invention is an auto termination and auto extend feature. The auto termination feature advantageously allows a conference to be disconnected without requiring user intervention. The auto extension feature of the present invention advantageously allows conferences of indefinite duration to be reserved.

Another aspect of the present invention is offering virtual meeting room services. The virtual meeting room services enables a third party to control and manage one or more virtual meeting rooms. Advantageously, this aspect enables peers in the third party organization to set a virtual meeting much as they would set a conventional meeting, for example, using their own scheduling server.

Each third party organization may receive one or more dial-in numbers. A dial-in number is a network address that can be used to connect potential conferees to an MCU, and can comprise, for example, a PSTN dialing number, a ISDN dialing number, a URL, etc. Each dial-in number is associated with a profile, which defines the type of the conference that can be conducted by using the relevant dial-in number. The profile defines the "capabilities" of the virtual meeting room that is associated with the relevant dial-in number. Exemplary capabilities of a virtual meeting room may include, but are not limited, to the maximum number of conferees, type of the conference (audio only, audio and video, audio/video/data, data only), type of endpoints, transcoding, protocol and network types, etc., similar to how a conventional meeting room has its own unique features and appliances, such as the size of the meeting room, whether it includes projector, screen, or blackboard, etc. A profile may define a welcome message, such "Welcome to the Sales meeting," etc.

A profile may be associated with more than one type of networks. Therefore one profile (for a virtual meeting room) may have different dial-in numbers, one for each type of network that can be used during a virtual meeting that is associated with the profile. For example, if the virtual meeting room requires connecting only common telephone users, then an profile may be associated with only one PSTN dial-in number. If a required meeting is conducted over an IP network using IP protocols and addresses, such as but not limited to H.323 or SIP, the profile may be associated with only a URL address. If the virtual meeting includes multimedia endpoints that use a variety of protocols, such as H.320, H.323, SIP, regular telephone protocols, etc., then the relevant profile would be associated with three dial-in addresses, such as a PSTN dial-in number, a ISDN dial-in number, and a URL.

In one exemplary embodiment, a profile may be associated with one virtual meeting room. In an alternate embodiment, a profile may be associated with two or more virtual meeting rooms. In such an embodiment, each meeting room may have an NID (Numerical Identification). The NID and the relevant dial-in number are distributed to peers that are invited to the session that is associated with the relevant meeting room. When the session is established, the MCU may request the NID from each peer that calls the relevant dial-in number, and based on the NID the peer is connected to the appropriate virtual meeting room. Other exemplary embodiment may offer the two types of profiles to a third party organization.

The profiles of the various types of virtual meeting rooms that are used by a third party organization preferably need to be defined only once, based on the understanding between the third party and the provider of the conferencing resources, which can be accomplished through cooperation of the system administrators for both sides. The profile may be updated from time to time. Certain aspects of the profile (the capabilities of the virtual meeting room) can be made available to peers in the third party organization, such as the size of the virtual meeting room (the maximum number of conferees), the type of medias that can be used in the virtual meeting room, etc. Some of the profiles with or without associated NID may be provided so as to dedicate certain virtual meeting rooms for a specific groups or individuals in the third party organization, such as a virtual meeting room for the sales department, for management, for technical staff or various project groups, etc.

A moderator of a virtual meeting may thus select an appropriate virtual meeting room (profile) based on the requirements of the meeting and the capabilities of the virtual meeting room, much in the same way that an assistant might select a physical meeting room.

DETAILED DESCRIPTION

A first exemplary embodiment of the present invention is a limited operator system. In this embodiment, the system assigns a dial-in number to a customer, which can be a telephone number, an IP address etc. The customer and conference co-participants use this dial-in number whenever they want to have a conference. When a participant uses his or her terminal to dial this number, the system will automatically initiate the conference. In addition, for each terminal that dials this number, the system will automatically connect the terminal to the conference. When all participants disconnect, the conference is terminated. Using this embodiment, the participants can initiate the conference at any time by simply by dialing the conference dial-in number. Thus, this embodiment of the present invention only requires a one-time contact with an operator in order to acquire the dial-in number. This one time can be performed at anytime without connection to a certain conference.

FIG. 1, discussed earlier, is a block diagram illustrating a typical system architecture of an audio and/or video conferencing system, which may be used in this first embodiment of the invention. The limited operator exemplary embodiment of the reservationless system envisions that one the dial-in number has been assigned, the operator 112 is no longer required. The limited operator embodiment includes a multi-point control unit ("MCU") 110 and an operator console 116. The MCU 110 is a conference controlling entity and is typically a piece of equipment located in a node of the network or in a terminal which receives several physical or logical channels from access ports and, according to certain criteria, processes audiovisual signals and distributes them to the connected channels. Examples of MCUs include the MGC-100, which is available from Polycom Inc. The MCU 110 and the operator console 116 are typically located at a conference service provider site, although this is not mandatory.

Each participant in a conference utilizes a terminal 114, which is an endpoint on a network, capable of providing real-time, two-way audio and/or visual communication with other terminals 114 or an MCU 110. The information communicated between the terminals 114 and/or the MCU 110 includes control signals, indicators, audio, moving color video pictures and/or data. A terminal 114 may provide speech only, speech and data, speech and video, or speech, data and video. A more thorough definition of a terminal can be found, for example, in the International Telecommunication Union ("ITU") standards H.320, H.321, and H.323. (The ITU is the United Nations Specialized Agency in the field of telecommunications. The ITU Telecommunication Standardization Sector (ITU-T) is a permanent organization of the ITU, and is responsible for studying technical, operating, and tariff issues and provides recommendations with a view toward standardizing telecommunications on a worldwide basis. Additional information regarding the ITU can be found at the website address of www.itu.int).

The customer administrator 120 can exert control over each of the terminals 114 through an administrator/terminal interface 108. Each terminal 114 interfaces to the MCU 110 over a conference interface 106. The MCU 110 includes a memory storage element 118 and communicates with the operator console 116 via interface 104. Optionally, the MCU 110 may interface to a server 122 having an additional storage element 124.

Figure 2A:
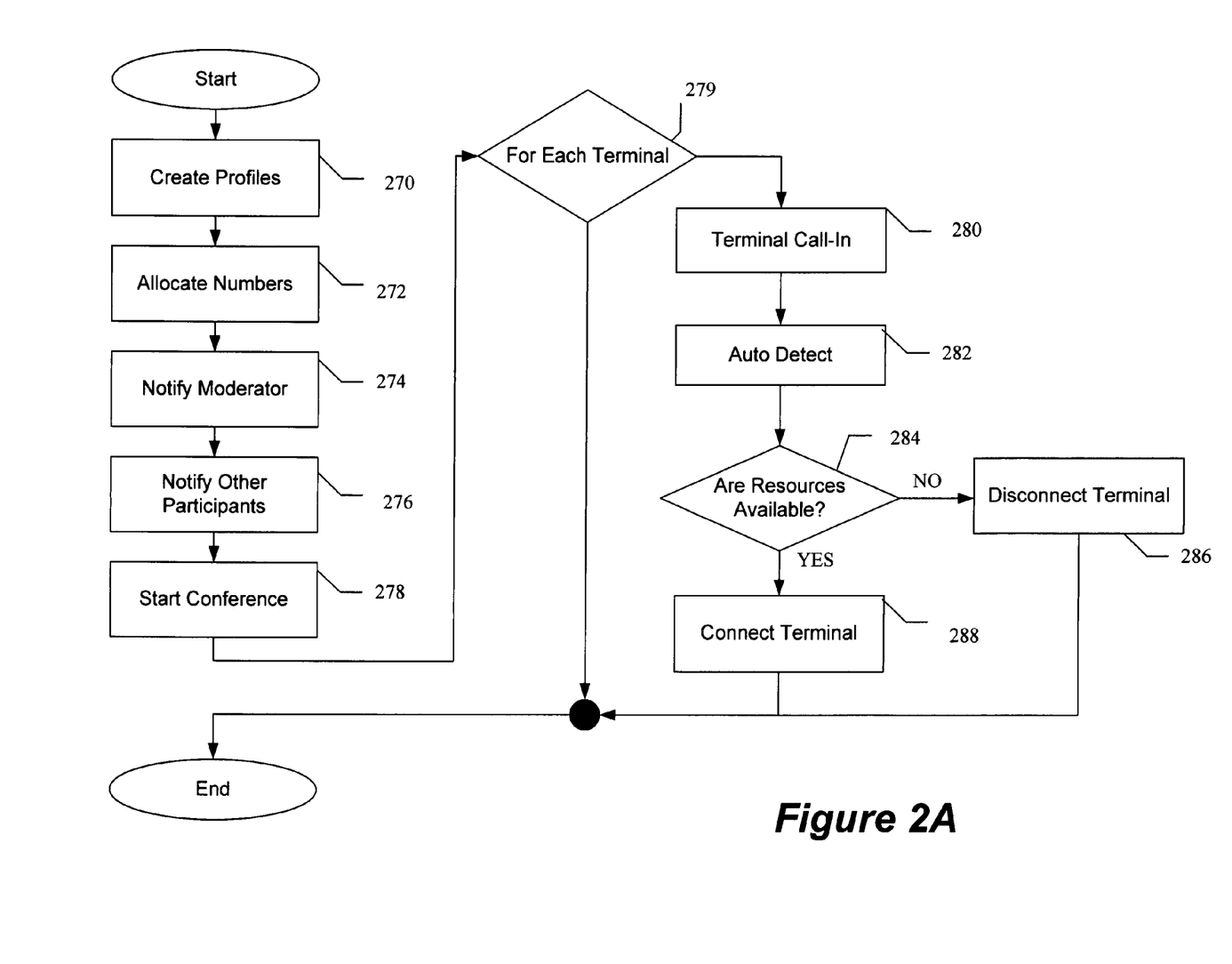
FIG. 2A is a flow diagram illustrating the steps performed in an exemplary embodiment of creating a reservationless conference.

FIG. 2A is a flow diagram illustrating the steps involved in an exemplary embodiment of creating a reservationless conference. The customer initiating or organizing the conference is referred to as a moderator. Initially, the moderator creates a conference profile 270. To accomplish this, the moderator communicates with the operator and defines the parameters of the conference, such as the maximum bit-rate, whether or not transcoding is to be used, the video layout, or similar information. The moderator is not required to provide the conference start-time, duration, or the number of participants in the conference. Once the operator enters the conference profile into the system, a conference profile form is sent via the operator console 116 to the MCU 110 via interface 104.

Next, a dial-in number is allocated for the conference 272. This occurs upon receiving the conference profile form, at which point the dial-in number for the conference is assigned by the MCU 110. The MCU 110 is configured to have a range of dial-in numbers, and the dial-in numbers are allocated to conference profiles using an assignment algorithm. The assignment algorithm can take a variety of forms and the present invention is not limited to any particular algorithm. In an exemplary embodiment, the assignment algorithm may be a first-come/first-served algorithm. For example, if the range of numbers held by the MCU 110 is 1000 to 5000, then the first conference profile will be assigned number 1000, the second 1001, etc. After assigning a dial-in number, the MCU 110 notifies the operator 112 that the dial-in number has been assigned. The MCU 110 provides this notice through the operator console 116 via interface 104.

After receiving the dial-in number from the operator console 116, the operator 112 notifies the moderator or any participant in the conference of the conference dial-in number 274. The moderator distributes the conference dial-in number 276 to the other participants of the conference (if not already distributed) using a variety of techniques including, but not limited to, placing a telephone call, or sending notice in the mail, e-mail, or facsimile.

Once a conference profile has been created, the moderator can delete the conference profile at any time by contacting the operator 112 to delete the conference. The operator 112, upon receiving such notice, will delete the conference profile via the operator console 116. After deleting a conference profile, or in conjunction therewith, the operator console 116 notifies the MCU 110. In response to receiving such notice, the MCU 110 removes the conference profile record from its internal storage 118, allowing for the dial-in number to be reallocated to new conference profiles. In an alternative embodiment, the moderator may be given access to the operator console 116 to delete the profile without the interaction with the operator 112.

When the moderator or any other participant wishes to start the conference 278, he/she dials the dial-in number from a terminal 114. Upon receiving the call, the MCU 110 searches for a conference profile match. A conference profile match is found if a conference profile is associated with the same dial-in number that was called. To identify a match, the MCU 110 searches its internal storage 118, and if such a match is found, the MCU 110 starts the conference immediately. The start time of the conference is the current time and the conference will last for a pre-defined time duration T, where T is part of the conference profile.

If a conference profile match is not found, the MCU 110 may optionally connect to an external or optional server 122. The optional server 122 includes a processing unit with a storage device 124 connected to the MCU 110 via a network connection or some other communication path 126. The MCU 110 provides the dial-in number to the optional server 122, which searches its internal storage 124 for a conference profile with the same dial-in number. If such a conference profile is found, the optional server 122 orders the MCU 110 to start the conference immediately. Again, the start time of the conference is the current time, and the duration of the conference is a pre-defined time duration T as previously defined.

If a match is not found, the MCU 110 may reject the call, display an audiovisual message to the calling terminal and/or transfer the call to a service provider operator. The remaining steps of this embodiment of the invention are described below following a description of an alternate embodiment of the present invention. The following steps, 279 to 288, are described after the description of FIG. 3A.

Figure 3A:
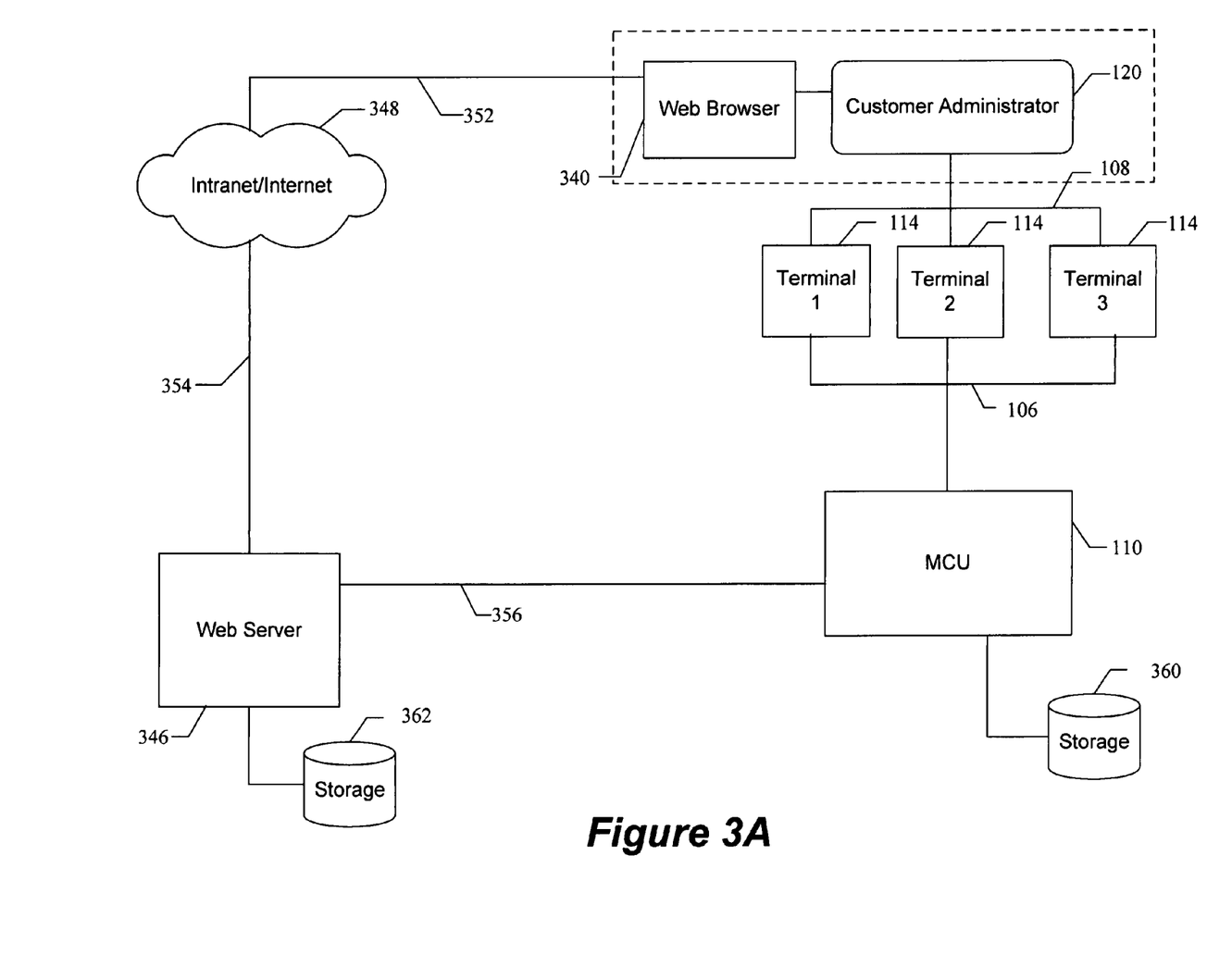
FIG. 3A is a block diagram illustrating an exemplary embodiment of the present invention.

FIG. 3A is a block diagram illustrating a system for a second exemplary embodiment of the present invention. The second exemplary embodiment of the present invention is an operator-independent system, in which the need for the operator is totally eliminated. The reservationless system in this embodiment includes, but is not limited to, an MCU 110, a web server 346, and a web browser 340. One possible configuration for the web server 346 is a Microsoft NT server running IIS4. The web browser 340 may include a variety of commercially available browsers, such as the Microsoft Internet Explorer, or a proprietary browser. The web browser 340 connects to an intranet or Internet 348 over a first connection 352. The web server 346 is connected to the intranet or Internet 348 over a second connection 354. Thus, the web browser 340 can connect to the web server 346 via the intranet or Internet 348. The web browser 340 can comprise any communication program that can interface to the web server over a networked connection. Thus, the present invention is not limited to a web browser, or any particular web browser. In general, the functions of the web browser can be performed by a variety of communication programs including terminal emulators, FTP programs, SMTP programs or the like.

The MCU 110 and the web server 346 are typically located at the conference service provider site, but this is not mandatory, as the MCU 110 and the web server 346 can be integrated into a single unit. In an alternate embodiment, web server 346 may reside over the Intranet (Local Area Network 108) and communicates with the customer administrator 120 as well as with other peer terminals 114 over LAN 108. There are some cases in which the MCU 110 may also reside over the same LAN 108 with the web server 346, the customer administrator 120, and the terminals 114. Typically, the MCU 110 and the web server 346 communicate over a network communication connection 356, which can comprise an intranet, the Internet, a LAN, or any other communication connection capable of interfacing the web server 346 to the MCU 110. The web browser 340 is typically located at the customer site. A customer administrator 120 using the web browser 340 connects to a website hosted by the web server 346. The customer administrator 120 can create conference profiles, and optionally initiate conferences and monitor conferences via this connection to the website. The web server 346 may include additional server capabilities or may interface to another server to provide conferencing control.

The web server 346 provides a dial-in number for each conference profile. When a terminal 114 dials the dial-in number, the MCU 110 automatically initiates a conference, and also automatically connects each terminal 114 that dials this dial-in number to the conference. When all participants disconnect, the MCU 110 terminates the conference. Such a conference using this embodiment can be initiated anytime at the will of the participants simply by dialing the dial-in number as long as resources are available.

Figure 3B:
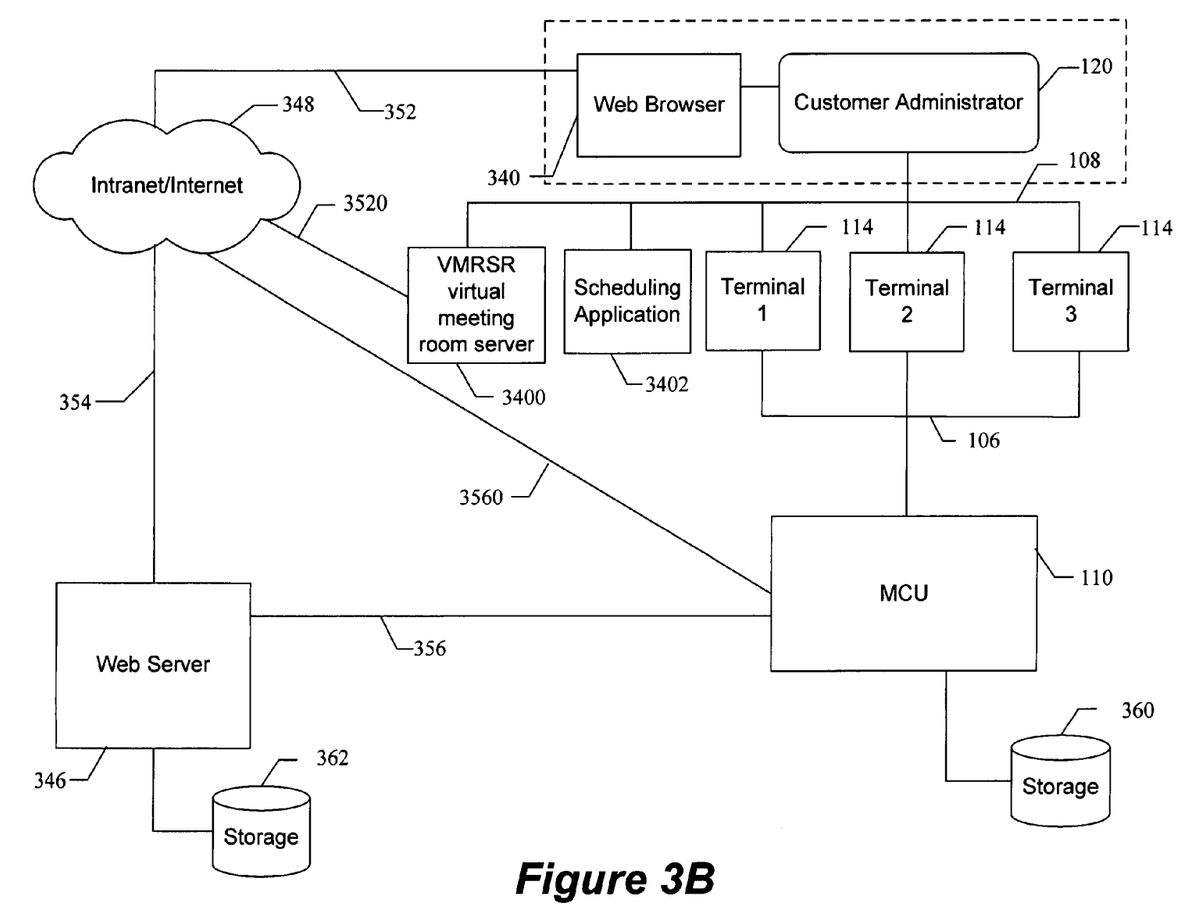
FIG. 3B is a block diagram illustrating another exemplary embodiment of the present invention in which a virtual meeting room is used.

FIG. 3B illustrates a system for a third exemplary embodiment of the present invention in which a virtual meeting rooms option is included. As explained earlier, one or more third parties (corporations, for example) may manage and control one or more virtual meeting rooms (VMR). To control the virtual meeting room, the third party may have a virtual meeting room server (VMRSR) 3400 connected over network 108 at the premises of the third party. The VMRSR 3400 may receive one or more dial-in numbers from the MCU 110 via web server 346 or directly from MCU 110 via network 348. In another exemplary embodiment, in which the MCU 110 is located at the third party's premises, the dial-in numbers may be allocated and loaded manually by the administrator. The designates dial-in numbers are allocated to the third party as long as the third party has the virtual meeting room option.

Each dial-in number is associated with a profile of a conference (and, therefore, a VMR). However, one or more dial-in numbers can be associated with two or more NIDs. In such an embodiment, each NID is associated with a VMR. The capabilities of the VMR are defined by the profile (the dial-in number) as discussed above. In any event, in this embodiment, a dial-in number can serve one or more conferences (VMRs) simultaneously. The VMRSR 3400 may include some or all of the functionalities of the web server 346, as discussed below. Indeed, the VMRSR 3400 and/or the web server 346 and/or the MCU 110 may reside in and be integrated with the same physical unit.

Furthermore, VMRSR 3400 may run a scheduling application such as Microsoft Outlook™ for example, or it may be communicate with another server 3402 in the third party organization that runs the scheduling application. The dial-in number can be represented as a meeting room (a VMR) in the scheduling program. Client/peers of the third party, such as potential conferees, third party administrators, or moderators of a virtual meeting (audio/video/data conference) may consult the VMRSR 3400 instead of the web server 346 to the set a virtual meeting room, in which case the VMRSR preferably responds by allocating an appropriate dial-in number to the caller, and/or a NID and password if it is required or desired.

In addition, the VMRSR 3400 preferably includes authentication capabilities to verify the rights of a conferee that dials one of the designated dial-in numbers. Thus, the MCU 110 may be configured to transfer information of a new incoming call using one of the designated dial-in numbers to the appropriate VMRSR 3400 for authentication, at which point the VMRSR may decide whether to connect the new call to the conference or to deny the call. The decision is transferred back to the MCU 110 which made the authentication request.

The VMRSR 3400, the MCU 110 and or the web server 346 keeps a copy of a table that includes information on the profiles as well as the associated dial-in numbers and NIDs. The table is preferably always kept synchronized. However, the NIDs may be allocated and managed by the VMRSR 3400 only, and such information about the NIDs may not be transferred to the MCU 110. The administrator 120 of the third party may add those VMRs (dial-in numbers) to the scheduling application that is used in the third party organization. An API (Application Program Interface) may be used to connect the scheduling application with the VMRSR 3400. Information concerning the VMRs may be reviewable by the third party peers, which may include the capabilities of the VMRs, the dial-in number, NID and password if needed, etc.

Referring again to FIG. 2A, the initial steps to be used in the second embodiment (i.e., using the system depicted in FIG. 3A) will be described, even though such initial steps may be similar to or redundant of the steps as described above with respect to the first embodiment. As with the first embodiment, the customer that initiates the conference, the customer administrator 120, will be referred to as the moderator.

Initially, the moderator 120 creates a conference profile 270. To accomplish this, the moderator 120 connects to the web service using web browser 340 and logs onto the web server 346 (for example, by providing a user name and a password). The moderator 120 is presented with a conference profile form for defining the conference parameters. The conference parameters may include the maximum bit-rate, whether or not transcoding is to be used, the video layout, whether the conference is a dial-in or a dial-out conference, etc. (In a dial-in conference, the participant calls the dial-in number; in a dial-out conference, the MCU 110 calls the participants). Optionally, these parameters can be preloaded with default values so the moderator 120 does not have to provide them. The moderator 120 is not required to enter the conference start-time, duration, or the number of participants in the conference.

Once the conference profile and other information is entered, the conference profile form and/or related information is sent via the web browser 340 to the web server 346. Next, a conference dial-in number is allocated 272. The web server 346 then allocates a dial-in number for the conference 272. The web server 346 is configured to have a range of dial-in numbers, and it allocates them to conference profiles using an assignment algorithm similar to that described in the first embodiment. After assigning a dial-in number, the web server 346 notifies the moderator 120 of the allocated dial-in number 274 through the web browser 340. In addition, the web server 346 may optionally notify the MCU 110 or other conference participants of the same. The dial-in numbers may also be allocated by the MCU 110 or by the conferencing resources provider.

The web server 346 provides the dial-in number to the moderator 120, or optionally any participant in the conference 276. The moderator 120 can distribute the conference dial-in number to the other participants or terminals 314 of the conference using a telephone, regular mail, e-mail, facsimile, or other similar means.

Once a conference profile has been created, the moderator 120 can delete or update the conference profile as necessary by contacting the web server 346 using the web browser 340. The web browser 340 will show the moderator 120 a list of existing conference profiles and the moderator 120 may select to delete or edit one or more of these profiles. When a conference profile is deleted or edited, the web browser 340 notifies the web server 346, which in turn removes or modifies the conference profile record in its internal storage 362. The web server 346 may optionally notify the MCU 110 that the conference profile has been deleted. The MCU 110 may then proceed to delete the conference profile from its internal memory 360.

In a dial-out conference, when the moderator 120 wishes to start the conference, he connects to the web server 346 using the web browser 340, and is presented with an option to start the conference as identified in the conference profile. When the moderator 120 selects to start the conference 278, the command is sent to the web server 346. The web server 346 then sends a message to the MCU 110 to start the conference immediately. By contrast, in a dial-in conference, the moderator 120 or any other participant may start the conference 278 by dialing the dial-in number. The start time of the conference is the current time and the duration of the conference will be a pre-defined time, T, which again may comprise part of the conference profile.

Once the conference is started on the MCU 110 the participants may join the conference by calling the dial-in number from their terminals 114.

The remaining steps illustrated in FIG. 2A are common to both the above-described first and second embodiments. For each terminal 114 requesting entrance to the conference 279, the requesting terminal 114 simply initiates a call to the dial-in number 280 (or is dialed and answers in a dial-out conference). As each terminal 114 joins the conference, the MCU 110 uses an auto-detection procedure 282 to identify the connecting terminals 114 and their parameters. The auto-detection procedure 282 ensures that all terminals 114 are able to connect to the conference successfully. More specifically, the goal of the auto-detection procedure 282 is to determine the connection rate for the requesting terminal 114, and the type of terminal that is making the request. Initially, the MCU 110 receives, with the connection message from the terminal 114, information about the type of the call that the terminal 114 is initiating. In an exemplary embodiment, this step can be performed in accordance with the Q.931 standard, which is known to those skilled in the art. If the call type is a "Voice" call, (for example, a PSTN phone device), the MCU 110 would determine that the terminal 114 is a voice-only terminal that uses a single channel. The MCU 110 then initiates the connection procedure for a voice terminal. The exact steps required for this process are known to those skilled in the art, and are more thoroughly described in ITU standards H.242 and H.221.

If the call type is not "Voice," the MCU 110 attempts to connect to the terminal 114 in a technique known as Bandwidth On Demand Interoperability Group ("BONDING"). BONDING is a method of aggregating communication channels, and involves aggregating B channels at the bit level. B channels are basic user channels that do not carry signaling information. If the BONDING connection succeeds, the terminal 114 requests a connection rate using the BONDING protocol. The MCU 110 adopts this rate as the terminal connection line rate and continues with the connection procedure for a BONDING terminal. However, if the BONDING negotiation fails (e.g., a time out has occurred because there was no valid response from the terminal), the MCU 110 reverts to a H.221 negotiation mode and tries to exchange capabilities with the terminal, and described in the ITU H.242 and H.221 standards. If this is successful, the terminal 114 notifies the MCU 110 of its highest connection rate capabilities, and the MCU 110 selects the terminal communication rate as the minimum of the terminal maximum rate (known by the terminal capabilities) or the conference maximum rate (which is preferably part of the conference profile).

Once the line rate and the terminal type are identified using the auto detection procedure 282, the MCU 110 determines if there are enough available resources for the terminal 114 (284). In this regard, the MCU 110 keeps a record of the total number of currently available resources and their types. For example, a resource type can be an audio codec, a video codec, or the like. A codec is a device used to decode or encode data, as is well known to those skilled in the art. The MCU 110 checks if the number of free (unused) resources is higher than or the same as the number of resources needed for the terminal 114 to connect to the conference 284. If sufficient resources are available, the terminal 114 is connected to the conference 288. The number of resources required by the terminal 114 is then deducted from the total number of available resources maintained and monitored by the MCU 110. However, if the MCU 110 determines that insufficient resources are available for the terminal 114, the terminal 114 is disconnected 286 from the MCU 110.

Figure 2B:
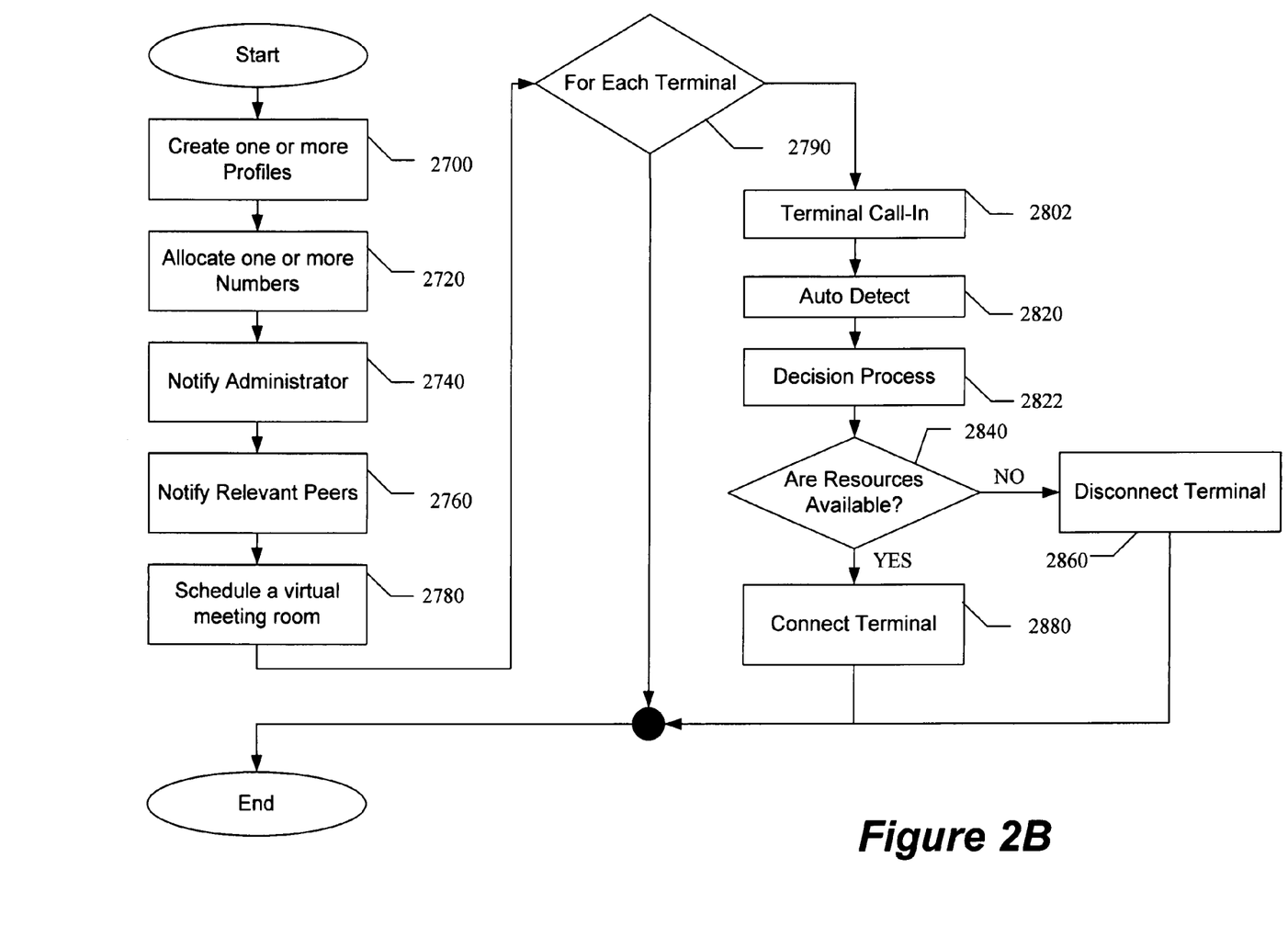
FIG. 2B is a flow diagram illustrating the steps performed in another exemplary embodiment in which a virtual meeting room is used.

In an alternate embodiment of the present invention in which virtual meeting rooms are used (i.e., FIG. 3B), the method of FIG. 2A may be slightly modified as depicted in FIG. 2B. Initially, an administrator 120 of a third party organization and the operator of the conference services provider create one or more conference profiles 2700. The number of profiles, the type of the profile, and the maximum number of virtual meeting rooms (VMR) that can be associated with each one of the profiles is based on the needs of the third party organization. Once the operator enters the one or more conference profiles into the system, a conference profile form for each one of the profiles is sent to the MCU 110. Alternately, the profile may be sent via browser 340 to web server 346 and from there to the MCU 110.

Next a dial-in number is allocated for each profile (type of virtual meeting room) 2720. After receiving the conference profile form, the MCU 110 assigns a dial-in number for each profile. Alternatively, the operator 112, of the conferencing service provider, may manually assign the dial-in numbers for each profile. In case that a profile represents two or more virtual meeting rooms, a NID for each VMR may be also be defined in this step. Alternatively, the third party's server 3400 (FIG. 3B) can define and/or deliver the NID to its peers. After assigning a dial-in number for each profile, the MCU 110 notifies the administrator 120 that the dial-in number has been assigned.

Where the MCU resides at the third party's premises, the administrator 120 of the third party may define the dial-in numbers as well as the NIDs that will be associated with each profile. Profile templates may be selected by the administrator 120 to assist in this function.

Some of the profiles may define that a password is need to join a particular VMR. In this case, VMRSR 3400 is responsible for managing the password and to authenticate its validity when a terminal 114 calls in to a VMR. Specifically, the MCU 110 preferably collects the NID and the password from the terminal 114 and transfers it to the VMRSR 3400 via web server 346 or via connection 3560.

After receiving the one or more dial-in numbers, the third party administrator 120 notifies the relevant peers 2760 (if not automatically notified earlier) about the VMRs, the VMRs capabilities, the dial-in number, and the NID and/or password associated with the dial-in number if needed. Informing the relevant peers may be done by using a variety of techniques including, but not limited to, sending a notice by e-mail, or by using a scheduling application.

Steps 2700 to 2760 may be done once, during installation of the VMRs. From time to time, the various profiles may be updated, deleted, or new profiles added according to the needs of the third party.

When a peer (moderator) from the third party organization wants to schedule a virtual meeting 2780, a scheduling application running on VMRSR 3400 or scheduling server 3402 can be used to select an appropriate VMR (a dial-in number). The virtual meeting room can be scheduled to start immediately (impromptu meeting) or in the future. The scheduling application also can be used to invite the other peers to the VMR. At the end of the scheduling process, a VMR is defined, and the dial-in number and NIDs/passwords (if needed) are delivered to the moderator for distribution to the peers or are delivered to both the moderator and the peers.

When the moderator or other participant wishes to start the conference, he/she dials the dial-in number from a terminal 114 (2802). In response, the MCU 110 searches for a conference profile match using the dial-in number. If such a match is found, the MCU 110 starts a session with the terminal(s) 114.

For each terminal 114 requesting entrance into the conference 2790, the requesting terminal 114 simply calls the dial-in number 2802. Once a terminal calls 2802, the auto detect process 2820 is performed, as described above. Thereafter, a decision process 2822 starts. The decision process used preferably depends on the profile that is associated with the dial-in number. Thus, in accordance with the profile, the MCU 110 may initiate an Interactive Voice Recognition (IVR) session and request information including but not limited to a NID, password, etc., with the response being transferred to the VMRSR 3400 for decision making. If the VMRSR 3400 approves the call, the MCU 110 may proceed to step 2840 to check resources. If the call is denied, it is disconnected, or alternatively may be transferred to a queue to a help desk. Returning to step 2840, if there are enough resources, then the terminal is connected 2880 to the appropriate virtual meeting room. If not, the call can be disconnected 2860, or alternatively may be transferred to a queue to the wait for resources to become free. The rest of the steps in FIG. 2B are similar to the steps in FIG. 2A as discussed above.

Another aspect of the present invention is to provide a method to control and monitor a video conference. During the conference, participants with access to a web browser 340 can be connected to the web server 346 to monitor and, optionally, control the conference though the web browser 340. The conference status (e.g., the number of connected parties, state of the video mute for each party, state of the audio mute for each party) is automatically updated and displayed on the browser screen. Participants can perform actions on the conference terminals 114 such as, connecting or disconnecting parties, activating or deactivating video or audio mute, requesting to extend the conference time, terminating the conference, or the like.

Figure 4:
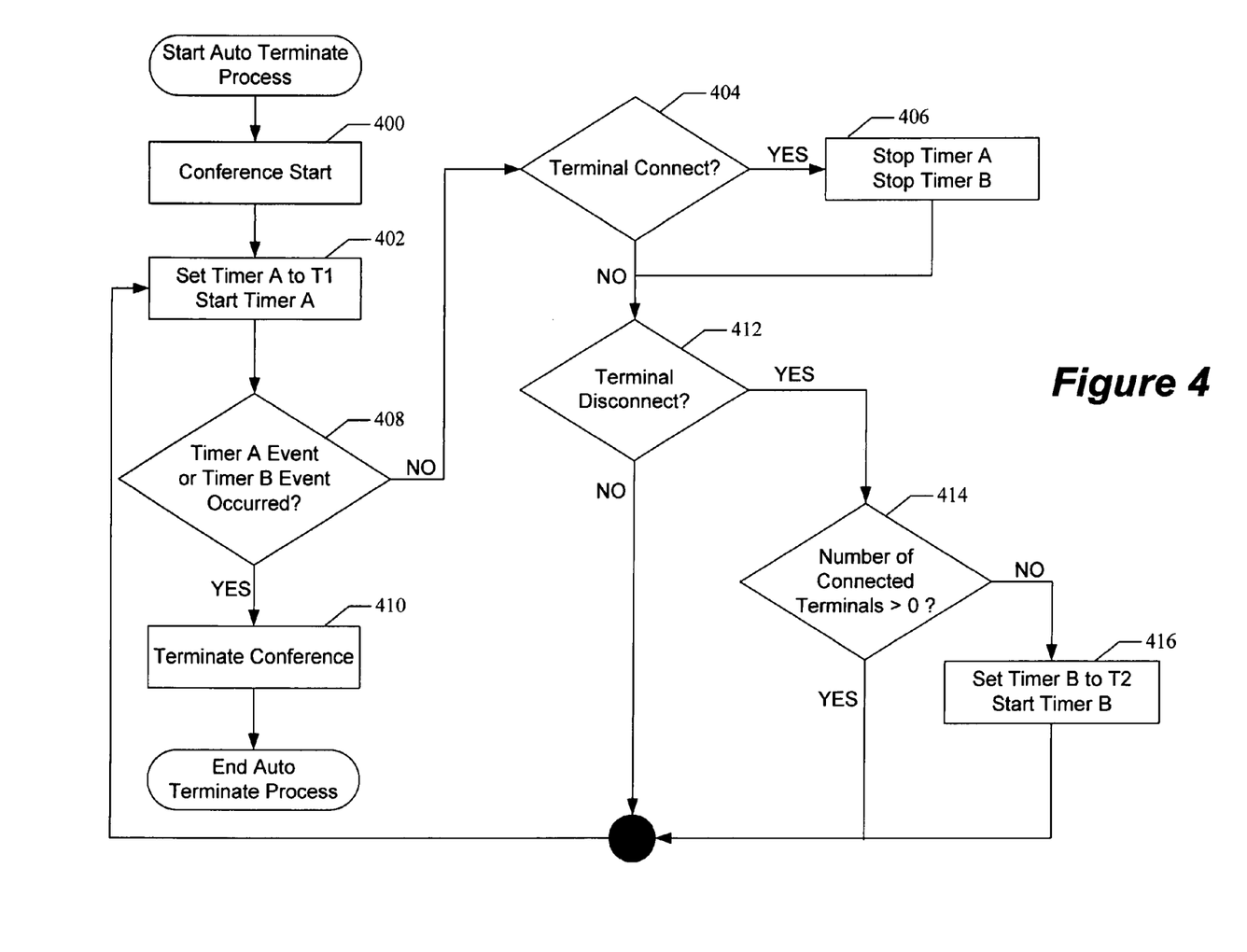
FIG. 4 is a flow diagram illustrating the operation of an auto terminate aspect of the present invention.

FIG. 4 is a flow diagram illustrating the operation the auto terminate aspect of the present invention. The auto termination algorithm is used to terminate a conference when it is no longer active (i.e., when no terminals are connected). This process can be performed without prior knowledge or specification of the conference duration. Advantageously, the auto termination process prevents inactive conferences from taking up resources that could be used by other conferences.

Each established conference includes two configurable time periods. One time period ("T1 or before-first-join") is the time limit for joining the conference. If no terminals connect to the conference within the T1 time period from starting the conference, the conference is automatically terminated. Another time period ("T2 or after-last-quit") is the time limit for holding the conference until after the last participant has left the conference. If a party connects to the conference within the T2 time period, the termination countdown is stopped.

In operation, the MCU 110 starts or accepts a conference initiation 400, and then Timers A (corresponding to T1) and B (corresponding to T2) are set as described further below. The MCU 110 activates the auto terminate feature only after at least one participant fully connects to the conference. Once a terminal is connected, the MCU 110 then sets a first timer ("Timer A") to the value of the T1 time period 402. If Timer A expires 408 prior to another terminal being connected 404, the MCU will terminate the conference 410. If another terminal is connected prior to Timer A expiring, the MCU will stop the Timer A countdown 406. Once all of the terminals are disconnected from the conference 412, 414, the MCU will set a second timer ("Timer B") to the T2 time period and initiate the countdown of the Timer B. If Timer B expires prior to a terminal connecting to the conference 404, then the conference will be terminated. Otherwise, the countdown of Timer B will be halted 406 and the conference will continue.

If time periods T1 or T2 are zero, the auto terminate feature will not be active. In this case, the web browser 340, an operator, or an H.243 chair control terminal can be used to terminate the conference.

Although the auto terminate feature is described as being included in the reservationless conferencing system, those skilled in the art will appreciate that this aspect of the present termination may also be used in reservation-based conferencing systems. In either system, because MCU's 110 resources are limited, a conference may have to be terminated to facilitate ing a new reserved conference.

Figure 5:
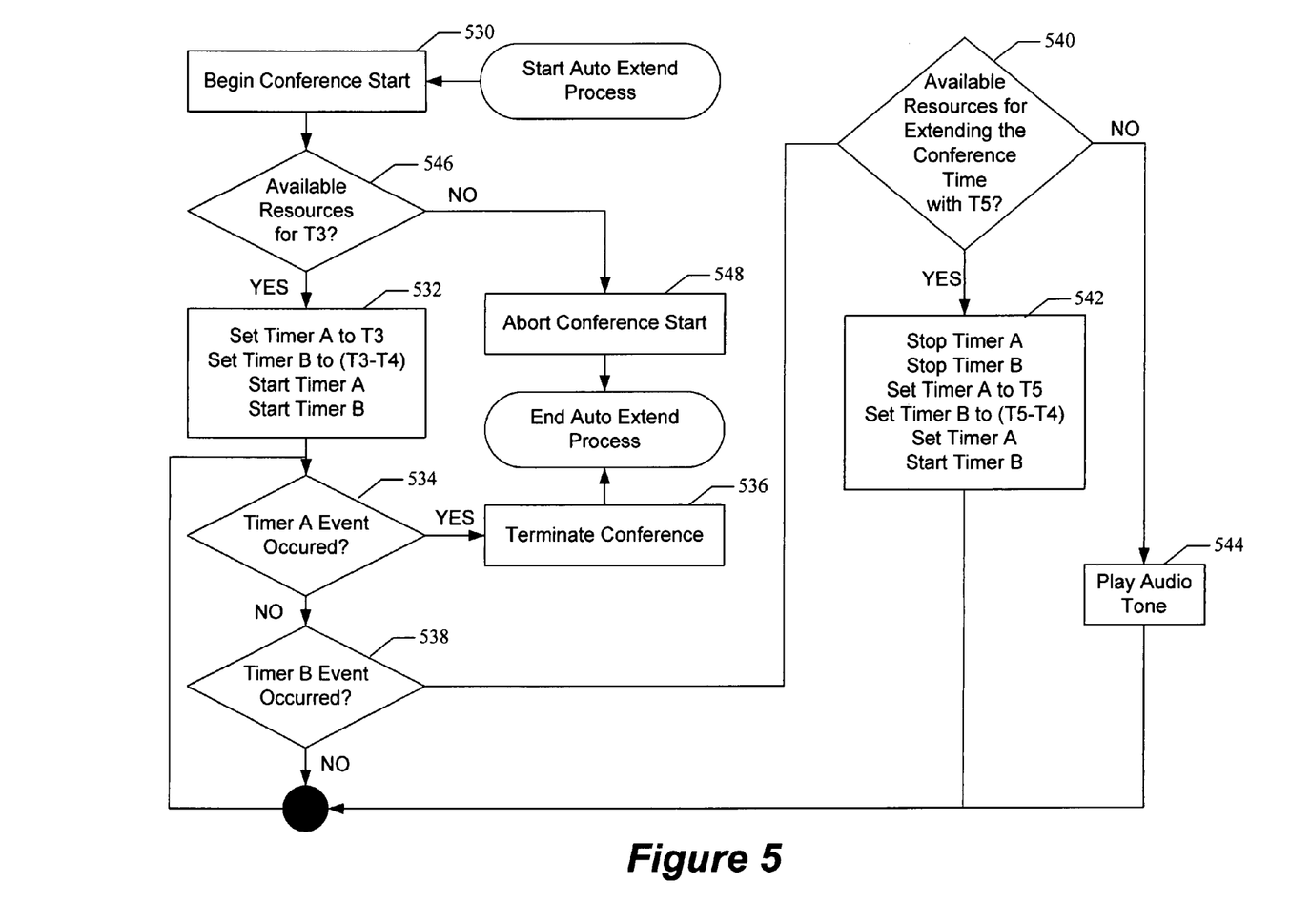
FIG. 5 is a flow diagram illustrating the auto extension aspect of the present invention.

FIG. 5 is a flow diagram illustrating the auto extension aspect of the present invention. Conferences initiated with embodiments of the present invention do not require a duration or a termination time. Instead, a pre-defined, MCU-configured duration is used as a default duration. However, to prevent inadvertently terminating a conference, an auto extension algorithm may be incorporated. The auto extension algorithm extends a virtual meeting room as long as resources are available, and optionally provides an audio tone warning to participants before the conference is terminated.

The system assigns three time intervals to each conference:
T3—minimum conference time;
T4—audio tone warning time prior to end of conference; and
T5—conference extend interval.

Preferably, T4 is less than or equal to T3 and/or T5. Upon initiation of a conference 530, the MCU 110 determines if sufficient resources are available for the conference to be active for time period T3 546. If sufficient resources are not available, the MCU 110 will abort the initiation of the conference 548. If sufficient resources are available, the MCU 110 will set a first timer ("Timer A") to time period T3, set a second timer ("Timer B") to a time period determined by the difference of T3 and T4, and start both Timer A and Timer B 532. If Timer A times out 534, the MCU 110 will terminate the conference 536. If Timer B times out, the MCU will determine if sufficient resources are available for the conference to be extended for time period T5 540. If sufficient resources are available, the MCU 110 will extend the conference duration by the time period T5 by (a) stopping Timer A and Timer B, (b) setting Timer A to time period T5, setting Timer B to a time period determined by the difference of T5 and T4, and (c) starting Timer A and Timer B 542. This allows the conference to continue, or to be automatically extended by the time period T5. If sufficient resources are not available, the MCU 110 will play an audio tone 544 to notify the participants that the conference may be terminating soon. If the MCU 110 detects that sufficient resources are available prior to the expiration of Timer B, then the conference can be extended by a time period of T5 by (a) stopping Timer A and Timer B, (b) setting Timer A to time period T5, setting Timer B to a time period determined by the difference of T5 and T4, and (c) starting Timer A and Timer B 542.

Figure 6:
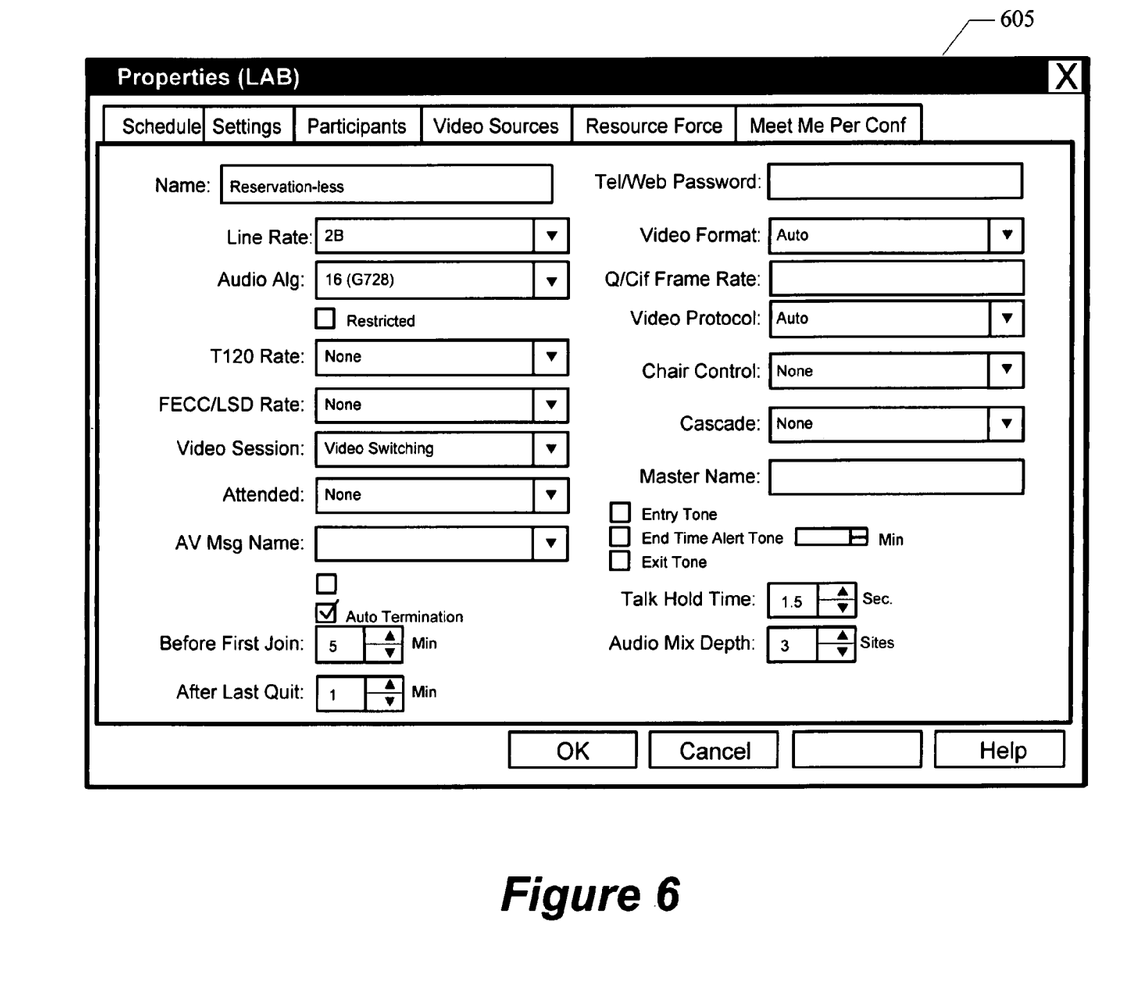
FIG. 6 is a screen image of an exemplary embodiment of a user interface showing conference profile settings.

FIG. 6 is a screen image of an exemplary embodiment of a user interface showing conference profile settings. In an exemplary embodiment of the present invention, a user interface 605 is provided for the user to specify a conference profile. Those skilled in the art will appreciate that alternate user interfaces may be used to allow the user to specify the conference profile.

The present invention has been described in relation to particular embodiments, which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application.

Alternate embodiments will become apparent to those skilled in the art to which the present invention pertains without departing from its spirit and scope. Accordingly, the scope of the present invention is described by the appended claims and supported by the foregoing description.

What is claimed is:

1. A method for conducting a conference using a virtual meeting room server managed by a third party, comprising:
    allocating a dial-in number to the third party, wherein the dial-in number provides connectivity to a virtual meeting room and is associated with a profile defining capabilities of the virtual meeting room;
    receiving calls from callers to the dial-in number to start or join a conference in the virtual meeting room;
    in response to each received call, determining at the virtual meeting room server whether the caller can be connected to the virtual meeting room; and
    if the caller can be connected, connecting the caller to the virtual meeting room.

2. The method of claim 1, further comprising determining if sufficient resources for the caller are available, and if so, connecting the caller to the virtual meeting room.

3. The method of claim 1, wherein the virtual meeting room server is located at a premises of the third party.

4. The method of claim 1, further comprising scheduling the virtual meeting room by requesting the virtual meeting room server to allocate the virtual meeting room at a particular time.

5. The method of claim 4, wherein scheduling the virtual meeting room is done via a scheduling application.

6. The method of claim 4, wherein scheduling the virtual meeting room comprises starting the conference immediately on-demand.

7. The method of claim 4, wherein the virtual meeting room server responds to the scheduling by delivering the dial-in number to a scheduling requester.

8. The method of claim 1, wherein the dial-in number is further accompanied by an identification number specific to the virtual meeting room associated with the dial-in number.

9. The method of claim 8, wherein the virtual meeting room server manages the identification number.

10. The method of claim 1, wherein the capabilities of the virtual meeting room comprise one or more capabilities selected from a group consisting of the maximum number of conferees, the type of the conference, the type of endpoints, transcoding requirements, and communication protocol types.

11. The method of claim 1, further comprising the steps of automatically detecting communication parameters of a connecting terminal that calls the dial-in number.

12. The method of claim 11, wherein the communication parameters comprise a connection rate for the connecting terminal and a terminal type for the connecting terminal.

13. The method of claim 11, wherein detecting the communication parameters is accomplished by assessing an on-demand bandwidth.

14. The method of claim 11, wherein detecting the communication parameters is accomplished using a H.221 negotiation mode.

15. A system for conducting a conference using a virtual meeting room server, comprising:
    a multipoint control unit;

a virtual meeting room server managed by a third party and coupled to the multipoint control unit via a network;

a storage storing at least one profile defining capabilities of a virtual meeting room;

a plurality of multimedia terminals communicatively coupled to the multipoint control unit, wherein at least one of the multimedia terminals is associated with a moderator terminal that is communicatively coupled to the virtual meeting room server;

wherein the virtual meeting room server is operative to:
(i) receive a request from the moderator terminal to schedule a virtual meeting room, and
(ii) assess whether a particular virtual meeting room is available and notifying the moderator terminal of the same; and a dial-in allocated to the third party, wherein the dial-in number provides connectivity to the virtual meeting room and is associated with a profile defining capabilities of the virtual meeting room.

16. The system of claim 15, wherein the virtual meeting room server is located at a premises of the third party.

17. The system of claim 15, further comprising a scheduling application communicatively coupled to the virtual meeting room server and the moderator terminal, which is configured to manage scheduling of the virtual meeting room.

18. The system of claim 15, wherein the moderator terminal is incorporated into its associated multimedia terminal.

19. The system of claim 15, wherein notifying the moderator terminal further comprises notifying the moderator terminal of the dial-in number.

20. The system of claim 15, wherein the virtual meeting room and the dial-in number are associated with the profile defining capabilities of the virtual meeting room.

21. The system of claim 20, wherein the association between the dial-in number and the profile is known to the multipoint control unit and to the virtual meeting room server.

22. The system of claim 15, wherein the multipoint control unit is operative:
to receive a call to a dial-in number associated with the virtual meeting room from one of the multimedia terminals, and
to start a decision process with the virtual meeting room server.

* * * * *